(12) United States Patent
Kumar et al.

(10) Patent No.: US 11,784,890 B2
(45) Date of Patent: Oct. 10, 2023

(54) LINK TRAINING THROUGH HANDSHAKE ON HIGH-SPEED INTERCONNECT

(71) Applicant: NVIDIA Corporation, Santa Clara, CA (US)

(72) Inventors: Seema Kumar, Santa Clara, CA (US); Ish Chadha, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 53 days.

(21) Appl. No.: 17/556,216

(22) Filed: Dec. 20, 2021

(65) Prior Publication Data

US 2023/0198852 A1 Jun. 22, 2023

(51) Int. Cl.
*H04L 27/01* (2006.01)
*H04L 41/14* (2022.01)
*G06N 20/00* (2019.01)

(52) U.S. Cl.
CPC ............. *H04L 41/14* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 2010/0272102 | A1* | 10/2010 | Kobayashi | H04N 21/43632 370/389 |
| 2014/0003451 | A1* | 1/2014 | Wagh | G06F 13/4282 370/468 |
| 2018/0091181 | A1* | 3/2018 | Alderrou | H04B 1/38 |
| 2022/0222198 | A1* | 7/2022 | Lanka | G06F 13/4273 |

FOREIGN PATENT DOCUMENTS

CN 110366842 A * 10/2019 .......... G06F 11/3006

* cited by examiner

*Primary Examiner* — Natisha D Cox
(74) *Attorney, Agent, or Firm* — Lowenstein Sandler LLP

(57) ABSTRACT

A system includes a first device and a second device coupled to a link including two or more data paths and a first portion and a second portion. The first device is to transmit a number of bits corresponding to a message before training the link on the first portion of the link, where the number of bits is equal to a number of the two or more data paths, and where each data path transmits one bit of the number of bits. The second device is to receive the message before training the link. The second device is to perform a decode operation on the number of bits received to determine the corresponding message and transmit a second message or data on the second portion of the link in response to performing the decode operation on the number of bits.

20 Claims, 6 Drawing Sheets

LINK TRAINING THROUGH HANDSHAKE ON HIGH-SPEED INTERCONNECT

TECHNICAL FIELD

At least one embodiment pertains to processing resources used to perform and facilitate high-speed communications. For example, at least one embodiment pertains to technology for training a link through a handshake method in a ground-referenced signaling (GRS) interconnect.

BACKGROUND

Communication systems transmit signals from a transmitter to a receiver via a communication channel or medium (e.g., cables, printed circuit boards, links, wirelessly, etc.) To ensure data is reliably communicated when communicating chip to chip (C2C), the communication channel (e.g., link) can be trained before data is transmitted. Some communication systems attempt to train the link by using software-managed initialization or switching between high-speed and low-speed modes. For example, the system can attempt to train the link by switching between high-speed and low-speed modes or use of a low-speed side-band channel during training to enable communication of data in the high-speed mode. Such conventional methods can cause additional hardware complexity and consume additional resources. Additionally, software-managed initialization can be unreliable in communication systems that utilize multiple chips having different software protocols where the link is the primary form of communication between the chips.

BRIEF DESCRIPTION OF DRAWINGS

Various embodiments in accordance with the present disclosure will be described with reference to the drawings, in which.

DETAILED DESCRIPTION

Figure 1:
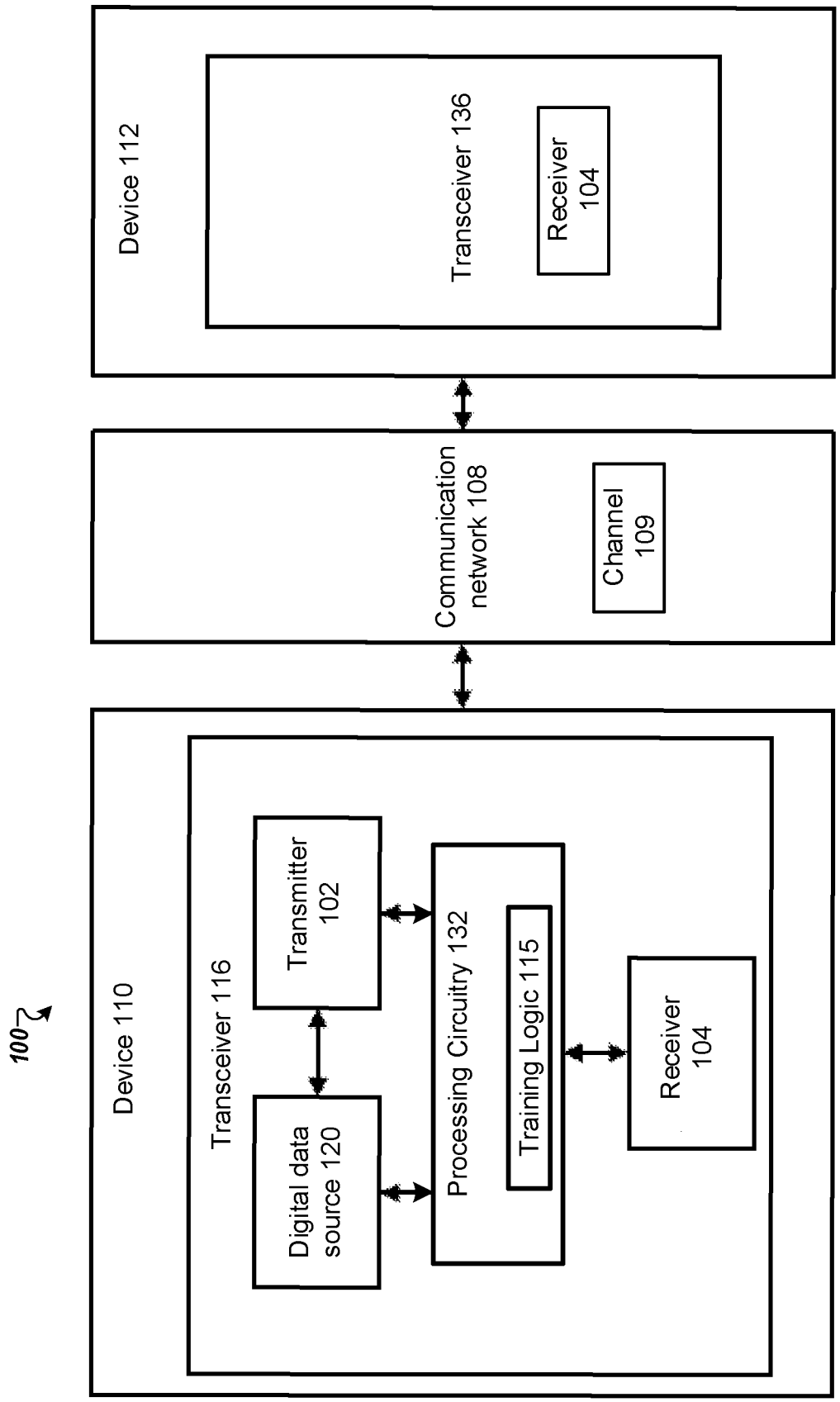
FIG. 1 is an example communication system employing a method to train a link, in accordance with at least some embodiments.

Communication systems transmit signals from a transmitter to a receiver via a communication channel or medium (e.g., cables, printed circuit boards, links, wirelessly, etc.). Some communication systems train the communication channel or medium (e.g., link) during an initialization sequence (e.g., before data is communicated) to ensure signals are transmitted reliably. For example, the communication system can train/calibrate the link for various analog and signal integrity (SI) parameters—e.g., offset calibration, phase interpolator (PI) training, frame boundary training, etc. Some communication systems can include multiple devices executing separate (e.g., isolated) software stacks. For example, a communication system may include a first device (e.g., a first integrated circuit (IC) or chip) and a second device (e.g., a second IC or chip) and communicate data via a ground-referenced signaling (GRS) link—e.g., the communication system may be a chip-to-chip (C2C) interconnect with both devices including a transmitter and a receiver. The first device and second device can run isolated software stacks which can cause the first device and second device to not be synchronized in their initialization sequence—e.g., the first device can be initialized and ready to perform training while the second device can be powering up. Because the first device and second device can be executing isolated software stacks, neither the first device nor second device can determine whether the other device is ready to train the link through software communication—e.g., software-managed initialization can be unreliable as either device can be in a different phase of the initialization sequence at a given time. Additionally, adding a dedicated low-speed pin to facilitate communications during the initialization sequence can increase pin overhead as the system utilizes pins that do not carry functional data. Similarly, switching between a high-speed mode and a low-speed mode of the link can add additional hardware complexity and involve software intervention, which can be unreliable when the first device and second device are executing isolated software stacks.

Advantageously, aspects of the present disclosure can address the deficiencies above and other challenges by providing a method for link training through a handshake message (e.g., protocol) before transmitting data from one device to the other device in the communication system. According to embodiments, while the link is being trained in one direction (e.g., from the first device to the second device), the other direction of the link (e.g., from the second device to the first device) can be utilized to transmit sideband messages (e.g., messages defined in a handshake protocol) associated with training or the initialization process. That is, the handshaking protocol can use paths of the link itself to communicate messages during the initialization process. For example, a communication system having an "N" number of data paths can communicate N-bit wide messages across the link. Accordingly, the communication system can define $2^N-1$ unique messages for the handshaking protocol. These messages can be stored at hardware associated with the link on both devices—e.g., both devices can have a controller or another hardware component associated with the link, and the handshaking messages can be defined at the controller. Additionally, to ensure the messages are communicated reliably on the untrained link, the communication system can transmit the message (e.g., message pattern remains static on the link) for at least a pre-defined amount of unit intervals (UI). For example, the communication system can transmit the message for at least three (3) UI to ensure the message is reliably sent over the untrained link.

By defining the handshaking protocol and transmitting the messages for a pre-defined time, the communication system can utilize the untrained link in one direction to transmit messages associated with training the link. Because the handshaking protocol is defined in existing hardware, the communication system can avoid consuming additional resources or relying on software intervention or communication. Accordingly, embodiments of the present application allow for a more reliable method to train the link in a high-speed interconnect system.

FIG. 1 illustrates an example communication system 100 according to at least one example embodiment. The system 100 includes a device 110, a communication network 108 including a communication channel 109, and a device 112. In at least one embodiment, devices 110 and 112 are two end-point devices in a computing system, such as a central processing unit (CPU) or graphics processing unit (GPU). In at least one embodiment, devices 110 and 112 are two servers. In at least one example embodiment, devices 110 and 112 correspond to one or more of a Personal Computer (PC), a laptop, a tablet, a smartphone, a server, a collection of servers, or the like. In some embodiments, the devices 110 and 112 may correspond to any appropriate type of device that communicates with other devices connected to a common type of communication network 108. According to embodiments, the receiver 104 of devices 110 or 112 may correspond to a GPU, a switch (e.g., a high-speed network switch), a network adapter, a CPU, a memory device, an input/output (I/O) device, other peripheral devices or components on a system-on-chip (SoC), or other devices and components at which a signal is received or measured, etc. As another specific but non-limiting example, the devices 110 and 112 may correspond to servers offering information resources, services, and/or applications to user devices, client devices, or other hosts in the system 100. In one example, devices 110 and 112 may correspond to network devices such as switches, network adapters, or data processing units (DPUs).

Examples of the communication network 108 that may be used to connect the devices 110 and 112 include an Internet Protocol (IP) network, an Ethernet network, an InfiniBand (IB) network, a Fibre Channel network, the Internet, a cellular communication network, a wireless communication network, a ground referenced signaling (GRS) link, combinations thereof (e.g., Fibre Channel over Ethernet), variants thereof, and/or the like. In one specific but non-limiting example, the communication network 108 is a network that enables data transmission between the devices 110 and 112 using data signals (e.g., digital, optical, wireless signals).

The device 110 includes a transceiver 116 for sending and receiving signals, for example, data signals. The data signals may be digital or optical signals modulated with data or other suitable signals for carrying data.

The transceiver 116 may include a digital data source 120, a transmitter 102, a receiver 104, and processing circuitry 132 that controls the transceiver 116. The digital data source 120 may include suitable hardware and/or software for outputting data in a digital format (e.g., in binary code and/or thermometer code). The digital data output by the digital data source 120 may be retrieved from memory (not illustrated) or generated according to input (e.g., user input).

The transmitter 124 includes suitable software and/or hardware for receiving digital data from the digital data source 120 and outputting data signals according to the digital data for transmission over the communication network 108 to a receiver 104 of device 112. Additional details of the structure of the transmitter 124 are discussed in more detail below with reference to the figures.

The receiver 104 of device 110 and 112 may include suitable hardware and/or software for receiving signals, such as data signals from the communication network 108. For example, the receiver 104 may include components for receiving processing signals to extract the data for storing in a memory, as described in detail below with respect to FIG. 2-FIG. 5.

The processing circuitry 132 may comprise software, hardware, or a combination thereof. For example, the processing circuitry 132 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry 132 may comprise hardware, such as an application-specific integrated circuit (ASIC). Other non-limiting examples of the processing circuitry 132 include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry 132 may be provided on a Printed Circuit Board (PCB) or collection of PCBs. It should be appreciated that any appropriate type of electrical component or collection of electrical components may be suitable for inclusion in the processing circuitry 132. The processing circuitry 132 may send and/or receive signals to and/or from other elements of the transceiver 116 to control the overall operation of the transceiver 116.

In some examples, processing circuitry 132 can include training logic 115. In an embodiment, training logic 115 can be configured to store and select messages defined in a handshaking protocol as described with reference to FIG. 2. In some embodiments, training logic 115 can facilitate training the communication network 108. For example, training 115 can select a message from the stored messages and send the message to the transmitter 102. In such examples, the transmitter 102 can transmit the message to the device 112. In some embodiments, the message can include indicating to start training, stop training, pause training, etc. Additional details regarding the training logic 115 are described with reference to FIG. 4.

The transceiver 116 or selected elements of the transceiver 116 may take the form of a pluggable card or controller for the device 110. For example, the transceiver 116 or selected elements of the transceiver 116 may be implemented on a network interface card (NIC).

The device 112 may include a transceiver 136 for sending and receiving signals, for example, data signals over a channel 109 of the communication network 108. The same or similar structure of the transceiver 116 may be applied to transceiver 136, and thus, the structure of transceiver 136 is not described separately.

Although not explicitly shown, it should be appreciated that devices 110 and 112 and the transceivers 116 and 120 may include other processing devices, storage devices, and/or communication interfaces generally associated with computing tasks, such as sending and receiving data.

Figure 2:
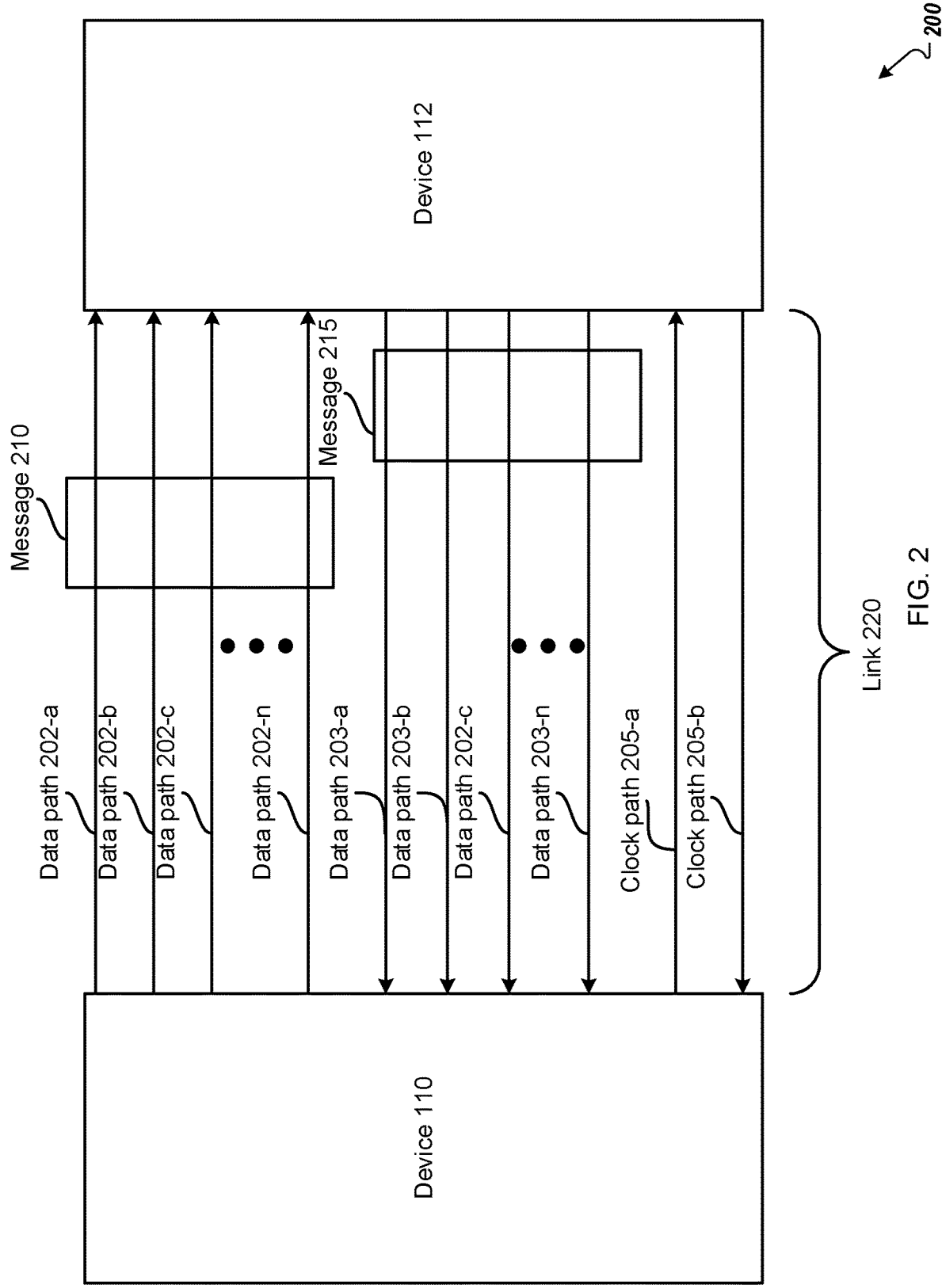
FIG. 2 illustrates an example communication system employing a method to train a link, in accordance with at least some embodiments.

FIG. 2 illustrates an example communication system 200 according to at least one example embodiment. The system 200 includes a device 110 and a device 112 as described with reference to FIG. 1. The device 110 and device 112 can be coupled to a link 220. In at least one embodiment, the link 220 can be an example of communication network 108 as described with reference to FIG. 1. In at least one embodiment, link 220 can be an example of a high-speed interconnect. For example, link 220 can be an example of a ground referenced signaling (GRS) link 220. In an embodiment, the GRS link 220 can be a signaling scheme used for serial data transfer between devices 110 and 112. In at least one embodiment, the GRS link 220 can be a high-speed link (e.g., transferring 40 gigabits per second (GBPS)). In at least one embodiment, the link 220 may include RC-dominated channels and LC transmission lines. Additionally, the GRS link 220 may be an on-chip link, a link across a substrate (e.g., organic package), or link signaling over a printed circuit board (PCB). In some examples, GRS link 220 may use a ground network as a signal reference voltage—e.g., ground may be the return signaling.

In at least one embodiment, the link 220 can include data paths 202 and data paths 203 configured to transmit signals, data, messages, etc. between the device 110 and device 112. For example, data paths 202 can be associated with communicating signals, data, or messages from device 110 to device 112 and data paths 203 can be associated with communicating signals, data, or messages from device 112 to device 110—e.g., data paths 202 can be associated with a transmitter 102 of device 110 and data paths 203 can be associated with a transmitter of device 112. In at least one embodiment, the link 220 can include a same number of data paths 202 and data paths 203. In that, a data path 202 can be associated with a data path 203—e.g., data path 202-*a* and data path 203-*a* can be a single transmitter/receiver data path pair. In at least one embodiment, the link 220 can include an "N" number of data path pairs—e.g., an "N" number of data paths 202 and data paths 203. In some embodiments, data paths 202 can be associated with a forwarded clock path 205-*a* and data paths 203 can be associated with a forwarded clock path 205-*b*. In at least one embodiment, each clock path can be associated with at two or more data paths—e.g., at least two data paths 202 or data paths 203. In at least one embodiment, data paths 202 transmit data to device 112. In such embodiments, the data is latched on the forwarded clock at the receiver of device 112. In some embodiments, each data path 202 and data path 203 is identical—e.g., each data path 202 and data path 203 support a same signaling speed and include identical drivers and hardware.

In at least one embodiment, link 220 can be trained before communicating data (e.g., functional data) to ensure the data is communicated reliably—e.g., to avoid different delays across the data paths 202 and data paths 203. In such embodiment, the communication system 200 can utilize a handshaking protocol to communicate messages across the link 220 before the link 220 is trained for data communication. In at least one embodiment, the link 220 can be trained in one direction (e.g., from device 110 to device 112 or a first portion) and then the other direction (e.g., from device 112 to device 110 or a second portion). In at least one embodiment, the device 110 or device 112 can communicate messages to the other device using the direction of the link that is not being trained. For example, if the link 220 is being trained from device 110 to device 112 (e.g., data paths 202), device 112 can send messages to device 110 associated with training the link (or associated with other aspects of the initialization of the link 220) on data paths 203. In an embodiment, the device 110 or device 112 can communicate messages to the other device using the direction of the link that is being trained—e.g., handshaking messages can be transmitted in either direction of the link 220 including from the device getting trained and also from the device that is not being trained.

In at least one embodiment, device 110 and device 112 can transmit a message having an "N" number of bits. That is, in a communication system 200 having an "N" number of data paths 202 (or an "N" number of data paths 203), the link 220 can communicate a message having an "N" number of bits. For example, the link 220 can communicate a message 210 or a message 215 having an "N" number of bits. In such embodiments, the communication system 200 can define $2^N-1$ unique messages for the handshaking protocol. For example, if the link 220 includes four (4) data paths 202 and data paths 203, the communication system can define 15 unique messages. In other embodiments, the link 220 can include more than or less than four (4) data path pairs and accordingly define a different number of unique messages.

In some embodiments, the messages defined in the handshaking protocol can indicate to start training the link 220, end training the link 220, give a status of link 220, communicate information regarding a negotiation of link 220, pause training, request additional time for training, indicate to skip certain portions of training sequence, indicate not to train the link 220 at this time, indicate a device is not ready for link 220, indicate training, or any other message associated with training the link 220 or associated with the initialization of link 220. For example, table 1 illustrates a potential handshaking protocol for a link including three (3) data path paths 202 or data path paths 203:

TABLE 1

| Message transmitted | Message Definition |
| --- | --- |
| 001 | Link Ready |
| 010 | Start Training |
| 011 | End Training |
| 000 | No operation (NOP) |

In such embodiments, link ready can indicate that both device 110 and device 112 are powered on, initialized, and ready to perform training. In some embodiments, start training can indicate to start training or start a specific part of the training sequence. In at least one embodiment, end training can indicate the current training is done and proceed to next training or indicate all training is done.

Accordingly, device 110 and device 112 can communicate regarding when to train the link 220. In some embodiments, the number of messages defined is associated with a number of training calibration loops or a number of trainings to ensure the link 220 communicates data reliably. In one embodiment, the link 220 can undergo training for offset calibration, phase interpolation (PI), frame boundary synchronization (e.g., to ensure data communicated on each data path 202 or data path 203 is received at the same time at either device 110 or device 112), data scrambling configuration, or any other training associated with ensuring reliable data communication on link 220. In at least one embodiment, the messages can be defined at hardware on each of device 110 and device 112 associated with the link 220 as described with reference to FIG. 4.

Figure 3:
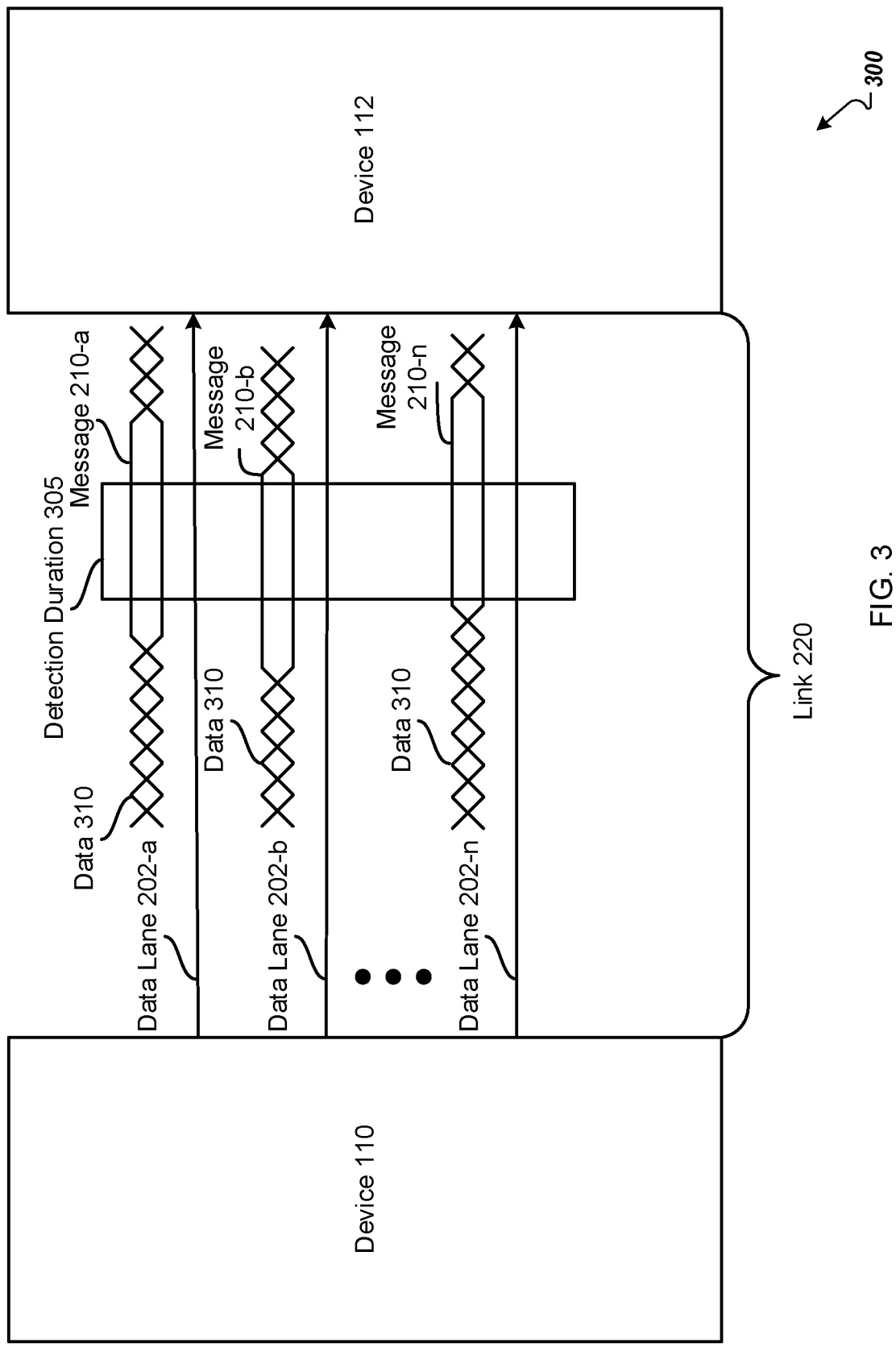
FIG. 3 illustrates an example communication system employing a method to train a link, in accordance with at least some embodiments.

FIG. 3 illustrates an example communication system 300 according to at least one example embodiment. In at least one embodiment, communication system 300 is an example of communication system 200 as described with reference to FIG. 2. The system 300 includes a device 110 and a device 112 as described with reference to FIG. 1. The device 110 and device 112 can be coupled to a link 220 as described with reference to FIG. 2—e.g., a GRS link 220. FIG. 3 illustrates an example of transmitting an encoded message using a handshaking protocol to communicate during an initialization phase or during link training. FIG. 3 illustrates sending the message 210 from device 110 to device 112 across data paths 202. Although it is a message from device 110 to device 112 shown, unless otherwise specified, the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. For example, the process described herein can be used to communicate a message 210 from device 112 to device 110 across data paths 203 as described with reference to FIG. 2. Additionally, the link 220 can be trained from device 110 to device 112 and from device 112 to device 110 in either order—e.g., data paths 202 and data paths 203 can be trained in any order.

As described above, device 110 and device 112 can communicate during an initialization sequence or training sequence based on messages defined—e.g., based on the defined handshaking protocol. In some embodiments, either device 110 or device 112 can select a message from the $2^N-1$ unique messages to communicate initialization or training information as described with reference to FIG. 4. For example, device 110 can select a message 210 to initiate training.

In some embodiments, message 210 can be communicated in a direction the link 220 is not being trained—e.g., if data paths 203 are being trained, device 110 can send a message 210 to device 112 on data paths 202. For example, if link 220 is being trained from device 112 to device 110 (e.g., data paths 203 are being trained), device 110 can communicate a message 210 to device 112, indicating that training should start. In some embodiments, the device 110 can communicate the message 210 to start training after a link 220 status is communicated or the negotiations about link 220 are communicated—e.g., after a link ready status is communicated indicating both device 110 and device 112 are powered on and ready to train the link 220. In some embodiments, device 110 can drive dummy data 310 (e.g., not functional data or random high-speed data patterns) across the link 220 (e.g., on each data path 202) while functional data is not communicated—e.g., drive the link 220 even when data is not communicated. In such embodiments, the device 110 can intersperse message 210 between the data 310.

In some embodiments, the link 220 can be untrained in the direction the messages 210 are transmitted—e.g., data paths 202 can be untrained when message 210 is transmitted from device 110 to device 112. In such embodiments, there can be delays and skews between the data paths in the untrained direction—e.g., between data paths 202. For example, skew on data path 202-b can cause a receiver of device 112 to receive data 310 sent on data path 202-b before receiving data 310 sent on data path 302-a even if a transmitter of device 110 transmitted the data 310 concurrently. Accordingly, to ensure the message 210 is sent reliably, the device 110 can transmit (e.g., keep static a pattern associated with message 210) message 210 for a pre-defined duration (e.g., pre-defined amount of time). That is, the device 110 can transmit the message 210 as a static pattern for a pre-defined duration (e.g., a pre-defined amount of time) or continuously/sequentially transmit the static pattern (e.g., the same pattern each time) for the pre-defined duration—e.g., device 110 can transmit the same bits on each data lane for the pre-defined duration or for multiple clock cycles of the transmitter. For example, device 110 can transmit the message 210 for at least three (3) burst lengths (BLs) to ensure reliable communication. In that, if the link 220 is configured with a burst length of eight (8), the link 220 can serialize eight (8) UI of parallel data during a high-speed clock cycle—e.g., a clock cycle associated with link 220. In such embodiments, the device 110 can keep transmitting the pattern for 24 UI—e.g., three times the burst length of eight (8). In other embodiments, the burst length can be greater than or less than eight (8). That is, the burst length can be defined by a ratio between a local clock of either device 110 or device 112 and a high-speed clock associated with the link 220—e.g., a ratio between the local clock associated with the parallel data to be communicated and the high-speed clock associated with the serialization of the parallel data. In some embodiments, the minimum pre-defined duration can be three (3) burst lengths. That is, the device 110 can communicate the message 210 for no less than three (3) burst lengths to ensure the data is reliable. In such examples, the device 110 can transmit the message 210 for more than three (3) burst lengths for increased reliability—e.g., the longer the message 210 is communicated, the more likely it is to be reliably received but this can also cause additional time to train the link 220.

In some embodiments, because the message 210 is communicated for at least three (3) burst lengths, the message 210 can be reliably detected by device 112. For example, device 110 can send the message 210 having a width of "N" bits—e.g., the message 210 can have an "N" number of bits as described with reference to FIG. 2. Accordingly, the device 110 can transmit a first bit of the message 210 (e.g., message 210-a) across data path 202-a, transmit a second bit of the message 210 (e.g., message 210-b) across data path 202-b, and transmit an "N" bit (e.g., message 210-n) of the message across data path 202-n. The device 112 can detect (e.g., look for) the message 210 during a detection duration 305. Accordingly, even if message 210-a is skewed from message 210-b and message 210-n (e.g., it is received before or after message 210-b and message 210-n), the device 112 can detect the message 210 because it is static for at least three (3) burst lengths—e.g., transmitting the message 210 for the three (3) burst lengths ensures that at device 112 can detect the message 210 during the detection duration 310. Accordingly, device 110 can communicate with device 112 across the untrained link 220 reliably.

In some embodiments, message 210 can be communicated in the direction the link 220 is being trained. In such embodiments, the device 110 can transmit training data 310 and intersperse message 210 between the training data 310 as described above—e.g., device 110 can communicate a message 210 that training is starting enabling the device 112 to determine data 310 received after message 210 is training data associated with training the link 220.

Figure 4:
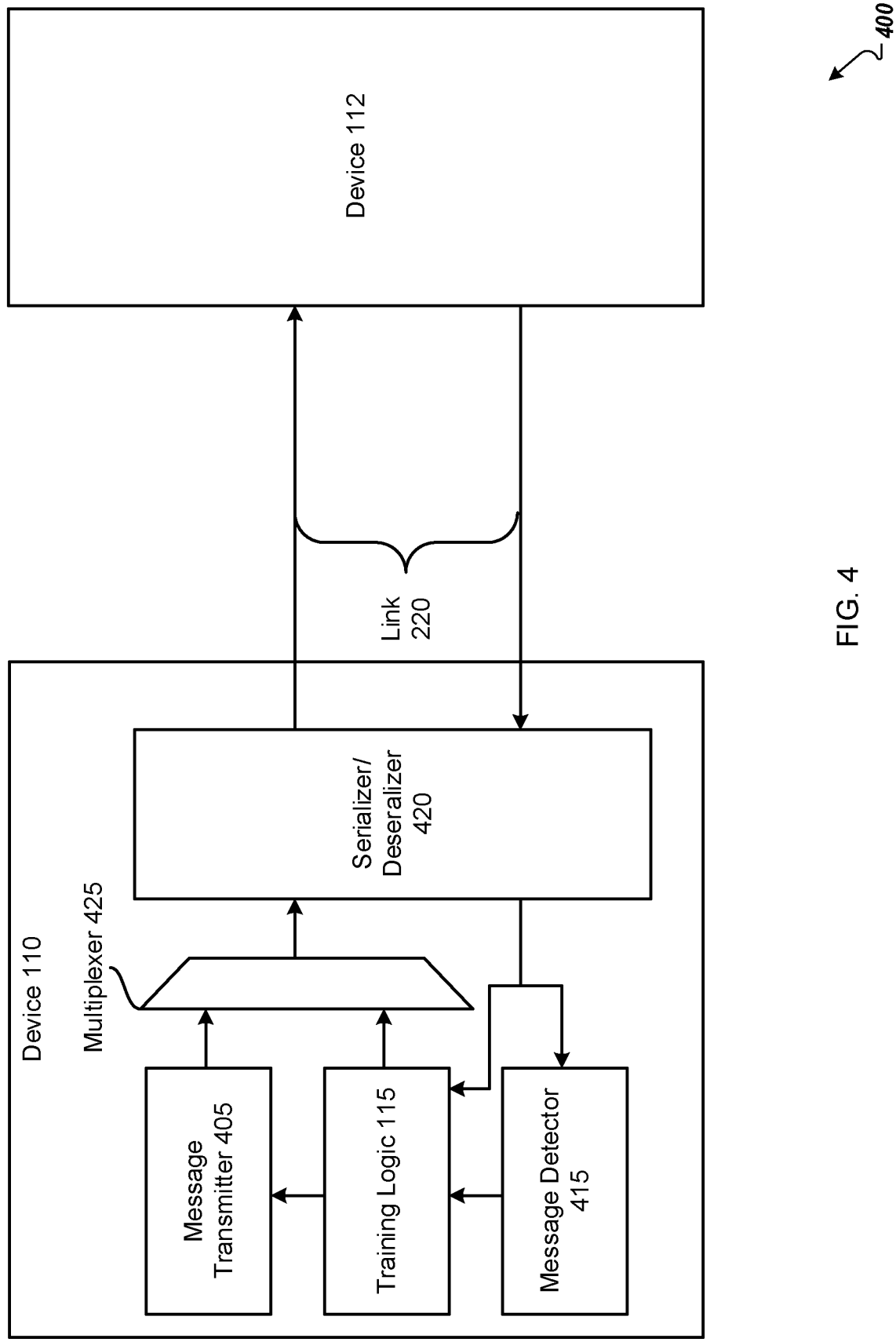
FIG. 4 is an example communication system employing a method to train a link, in accordance with at least some embodiments.

FIG. 4 illustrates an example communication system 400 according to at least one example embodiment. In at least one embodiment, communication system 400 is an example of communication system 100 and 200 as described with reference to FIGS. 1 and 2. The system 400 includes a device 110 and a device 112 as described with reference to FIG. 1. The device 110 and device 112 can be coupled to a link 220 as described with reference to FIG. 2—e.g., a GRS link 220. In an embodiment, device 110 can include message transmitter 405, training logic 115 (e.g., as described with reference to FIG. 1), message detector 415, serializer/deserializer 420, and multiplexer 425. In some embodiments, message transmitter 405 can be an example of or located within transmitter 102, training logic 115 can be an example of or located within processing circuitry 132, and messaging detector 415 can be an example of or located within receiver 104 as described with reference to FIG. 1. In at least one embodiment, device 112 can also include message transmitter 405, training logic 115, message detector 415, serializer/deserializer 420, and multiplexer 425.

Training logic 115 can be configured to store and select messages defined in a handshaking protocol as described with reference to FIG. 2. For example, training logic 115 can be configured to store $2^N-1$ unique messages, where "N" is a number of data paths 202 or 203. In some embodiments, device 112 can include training logic 115 configured to store the same messages as device 110—e.g., device 110 and device 112 can store the same messages to perform the link 220 training via the handshaking protocol. For example, training logic 115 can store table 1 as described with reference to FIG. 2. In an embodiment, training logic 115 can be configured to select a message from the set of defined messages during an initialization or training of the link 220. For example, the training logic 115 can select a message to start training, stop training, end training, perform no operation, request link status, perform link negotiations, etc. In at least one embodiment, training logic 115 can be configured to receive a decoded message from message detector 415. In such embodiments, the training logic 115 can perform actions associated with the decoded message. For example, training logic 115 can transmit training data to device 112 based on the decoded message. In some embodiments, training logic 115 can stop transmitting training data to device 112 based on a decoded message indicating stop training. In at least one embodiment, the training logic 115 can be configured to train the link based on receiving training data—e.g., perform offset calibration, phase interpolator training, data scrambling configuration, frame boundary synchronization, etc.

Message transmitter 405 can be configured to transmit messages received from training logic 405 to multiplexer 425. In at least one embodiment, message transmitter 405 can be configured to encode a message received from the training logic 115—e.g., encode the message selected by training logic 115. In some embodiments, message transmitter 405 can transmit the message for at least three (3) burst lengths as described with reference to FIG. 3.

Message detector 415 can be configured to receive messages from serializer/deserializer 420. In at least one embodiment, message detector 415 can perform a decode operation on a message received from serializer/deserializer 420 to determine the corresponding message. In some embodiments, message detector 415 can transmit the decoded message to training logic 115. In at least one embodiment, message detector 415 can detect (e.g., look for messages) for the detection duration 305 as described with reference to FIG. 3.

Multiplexer 425 can be configured to multiplex data or messages received from message transmitter 405 or training logic 115. For example, multiplexer 425 can multiplex an "N" number of bits corresponding to a message selected by training logic 115.

Serializer/deserializer 420 can be configured to serialize data/messages transmitted and deserialize messages received. For example, serializer/deserializer 420 can serialize a number of parallel bits into a serial stream of bits at each data path 202 or data path 203 of the link 220. In an embodiment, the parallel data bits at each data path 202 or data path 203 can correspond to three (3) or more burst lengths of a bit of the "N" number bits corresponding to a message transmitted from device 110 to device 112. For example, the serializer/deserializer 420 can serialize first parallel data bits to transmit a first bit for three (3) or more burst lengths on a first data path 202-$a$, serialize second parallel bits to transmit a second bit for (3) or more burst lengths on a second data path 202-$b$, and so forth until an "$N^{th}$" bit of the message is serialized and transmitted on an "$N^{th}$" data path 202-$n$. Similarly, the serializer/deserializer 420 can deserialize the message received by deserializing the serial stream of bits received at each data path 202—e.g., deserialize the stream of first bits at data path 202-$a$ to recover at least a portion of the first parallel data bits.

Figure 5:
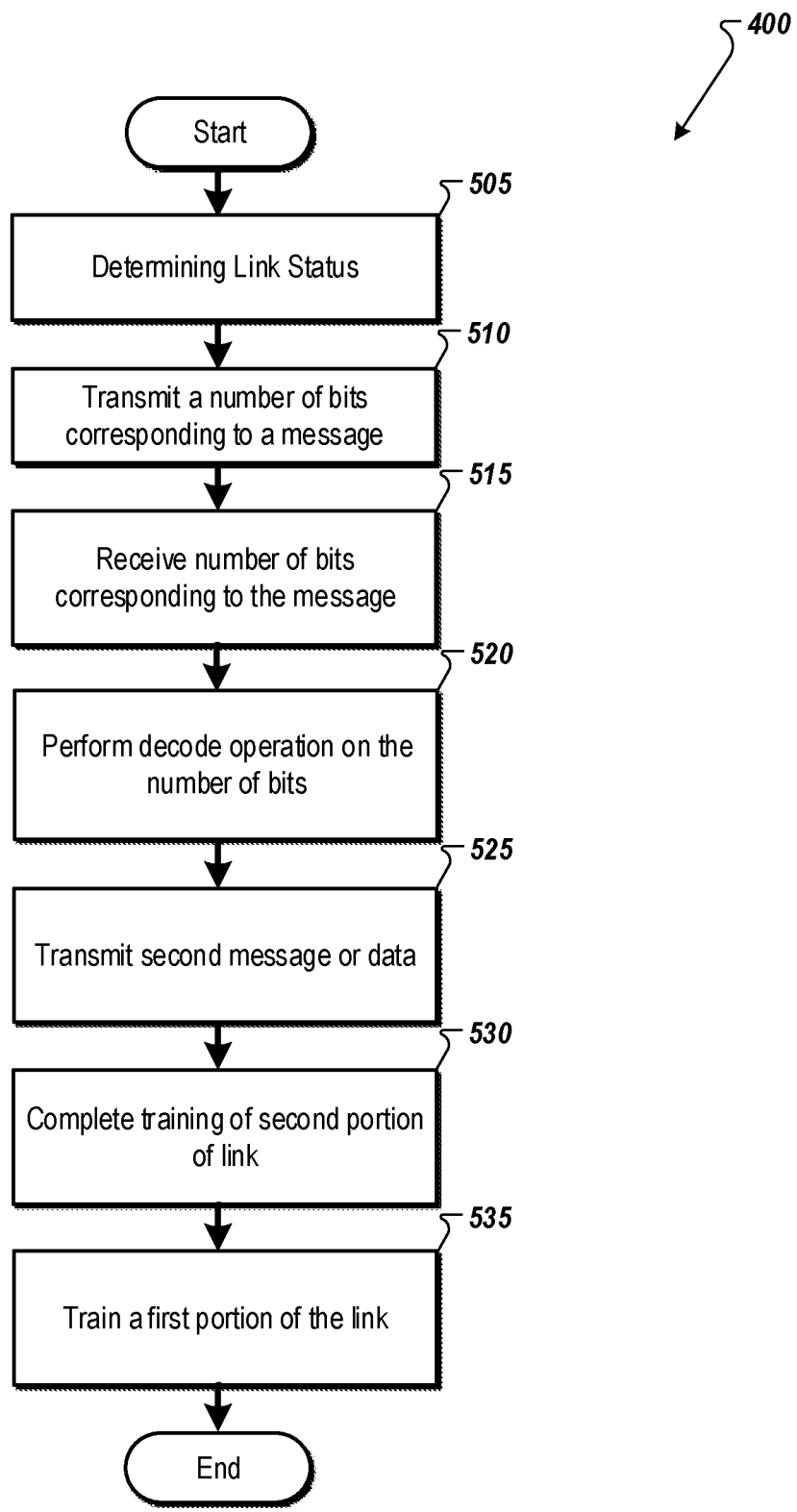
FIG. 5 is a flow diagram of a method to train a link through handshake for a high-speed interconnect system, in accordance with at least some embodiments.

FIG. 5 illustrates a flow diagram of a method 500 for training a link through handshaking in a high-speed interconnect. For example, method 500 illustrates sending predefined messages across an untrained link for at least three (3) burst lengths. The method 500 can be performed by processing logic comprising hardware, software, firmware, or any combination thereof. In at least one embodiment, the method 500 is performed by message transmitter 405, training logic 115, message detector 415, serializer/deserializer 420, and multiplexer 425 of the first device 110 or second device 112 as described with reference to FIG. 4. In some embodiments, the messages can be communicated on a GRS link 220 as described with reference to FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other diagrams illustrating a method for link training through handshaking are possible.

At operation 505, training logic 115 in either device 110 or device 112 can determine a status of link 220. For example, training logic 115 can determine whether the link is ready to be trained—e.g., both device 110 and device 112 are powered up, initialized, and ready for training. In at least one embodiment, either device 110 or device 112 can transmit a message indicating the link is ready to the other device—e.g., device 110 can transmit a message indicating the device 110 is ready for training the link. In some embodiments, the training logic 115 can determine the link status based on the received message—e.g., based on receiving the indication that the other device is ready for training. In at least one embodiment, the training logic 115 can determine the link status based on whether the device 110 or device 112 are initialized. For example, if device 110 is not ready for link training, the training logic 115 can determine the link status (e.g., the link is not ready to train) without receiving any messages. In some embodiments, determining the link status can be based on link negotiations between device 110 and device 112.

At operation 510, message transmitter 405 of device 110 can transmit a number of bits corresponding to a message associated with training a first portion of a link (e.g., data paths 203) coupled to a first device (e.g., device 110). In at least one embodiment, the link 220 can be trained either from device 110 to device 112 (e.g., first portion) or from device 112 to device 110 (e.g., second portion). In such embodiments, either portion can be trained first. In this embodiment, the second portion is trained first—e.g., the message transmitter 405 of device 110 can transmit the number of bits. As described with reference to FIGS. 2-4, training logic 115 can select a message from a plurality of messages stored associated with training the link or the initialization of the link 220—e.g., pre-defined messages associated with the handshaking protocol. For example, training logic in device 110 can select a message indicating to start training, and message transmitter 405 can encode the message and transmit it to device 112. In some embodiments, the message selected and transmitted can indicate at least one of initiating training of the link, pausing training of the link, completing training of the link, indicating a status of the link—e.g., the message can be associated with training the link, a status of the link, negotiations of the link, or any combination thereof. As described with reference to FIG. 2, each message can be "N" bits, where "N" is the number of data paths—e.g., the number of bits in the message is equal to a number of data paths in the two or more data paths coupled to device 110. Additionally, serializer/deserializer 420 can serialize the message such that one bit of the "N" bit message is transmitted on each data path—e.g., each data path transmit one bit of the number of bits. Because there are "N" bits per message, the training logic 115 can store $2^N-1$ unique messages—e.g., the number of messages in the plurality of messages corresponds to a number of data paths. In at least one embodiment, the message transmitter 405 can transmit the number of bits for at least three or more burst lengths as described with reference to FIG. 3. In some embodiments, the message can be transmitted before training the link.

At operation 515, a message detector 415 of device 112 can receive the number of bits corresponding to the message. In one embodiment, the message detector 415 can receive the number of bits before training the link. In an embodiment, the message can be associated with training the first portion of the link.

At operation 520, the message detector 415 of device 112 can perform a decode operation on the number of bits received to determine the corresponding message. In at least one embodiment, the message detector 415 can transmit the decoded message to the training logic 115.

At operation 525, the message transmitter 405 of device 112 can transmit a second message or data on the second portion of the link (e.g., from device 112 to device 110 over data paths 203). In at least one embodiment, the device 112 can transmit training data over the second portion of the link in response to performing the decode operation. For example, device 112 can transmit training data associated with training the first portion of the link in response to determining the message. In some embodiments, the training data can include data to perform offset calibration, phase interpolator training, determining signal integrity parameters, data scrambling configuration, etc.

At operation 530, the training logic 115 of the device 110 can train the second portion of the link. For example, the message detector 405 of device 110 can receive the second message or data from the second portion of the link and train the second portion of the link in response to receiving the second message or data. In at least one embodiment, after training the second portion, the training logic 115 can select a third message from the plurality of messages indicating to stop training—e.g., indicating that there is a completion of training the second portion of the link. In at least one embodiment, the message transmitter 405 of device 110 can transmit a second number of bits corresponding to the third message. In some embodiments, the training logic 115 of device 110 can transmit a third message indicating to proceed to a next step of training or pause training. In at least one embodiment, device 112 can receive the second number of bits corresponding to the third message, perform a second decode operation on the second number of bits to determine the third message, and stop transmitting the training data on the second portion of the link in response to receiving the third message—e.g., based on receiving the message to stop training. In some embodiments, the second device can send additional training data for the next training in a sequence for training the link.

At operation 535, the device 112 can train the first portion of the link—e.g., after device 110 completes training of the second portion, the device 112 can begin training the first portion of the link. As described above, training can be done in either order—e.g., with the first portion first or with the second portion first. In an embodiment, the message transmitter 405 of device 112 can transmit, to the first device, a third number of bits corresponding to a fourth message associated with training the first portion of the link. In some embodiments, the third number of bits can be equal to the number of data paths in the two or more data paths—e.g., the message can be "N" bits wide, where "N" is the number of data paths. In embodiments where the first portion is trained first, after transmitting the first message and receiving a second message that the training of the first portion is complete, the message transmitter 405 can transmit a third number of bits corresponding to a third message associated with training the second portion of the link coupled to the first device. In such embodiments, the third number of bits is equal to the number of data paths in the link, and each data path transmits one bit of the third number of bits. In at least some embodiments, the message detector 415 of the second device can receive the third number of bits corresponding to the third message, perform the decoder operation on the third bits to determine the corresponding third message, and transmit training data associated with training the second portion of the link in response to determining the third message. In either case (e.g., training the first portion or second portion first), the device training the link second can transmit a message indicating the training is complete to the other device and cause the other device to stop transmitting the training data. Accordingly, the link can be trained in both directions.

Figure 6:
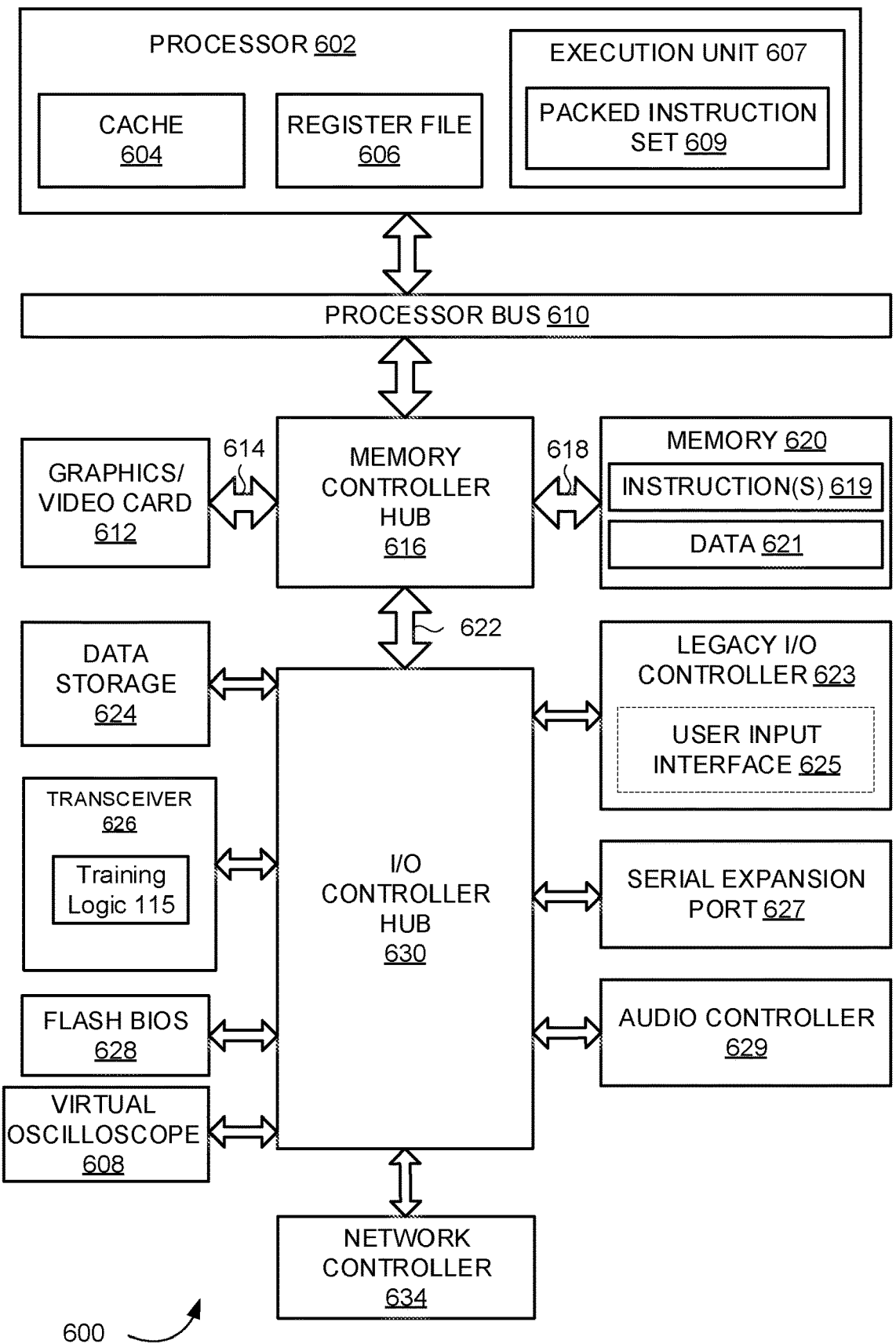
FIG. 6 illustrates an example computer system including a transceiver including a chip-to-chip interconnect, in accordance with at least some embodiments.

FIG. 6 illustrates a computer system 600 including a transceiver including a chip-to-chip interconnect, in accordance with at least one embodiment. In at least one embodiment, computer system 600 may be a system with interconnected devices and components, an SOC, or some combination. In at least one embodiment, computer system 600 is formed with a processor 602 that may include execution units to execute an instruction. In at least one embodiment, computer system 600 may include, without limitation, a component, such as processor 602 to employ execution units including logic to perform algorithms for processing data. In at least one embodiment, computer system 600 may include processors, such as PENTIUM® Processor family, Xeon™, Itanium®, XScale™ and/or StrongARM™, Intel® Core™, or Intel® Nervana™ microprocessors available from Intel Corporation of Santa Clara, Calif., although other systems (including PCs having other microprocessors, engineering workstations, set-top boxes and like) may also be used. In at least one embodiment, computer system 600 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 600 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 600 may be used in devices such as graphics processing units (GPUs), network adapters, central processing units and network devices such as switch (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 600 may include, without limitation, processor 602 that may include, without limitation, one or more execution units 607 that may be configured to execute a Compute Unified Device Architecture ("CUDA") (CUDA® is developed by NVIDIA Corporation of Santa Clara, Calif.) program. In at least one embodiment, a CUDA program is at least a portion of a software application written in a CUDA programming language. In at least one embodiment, computer system 600 is a single processor desktop or server system. In at least one embodiment, computer system 600 may be a multiprocessor system. In at least one embodiment, processor 602 may include, without limitation, a CISC microprocessor, a RISC microprocessor, a VLIW microprocessor, a processor implementing a combination of instruction sets, or any other processor device, such as a digital signal processor, for example. In at least one embodiment, processor 602 may be coupled to a processor bus 610 that may transmit data signals between processor 602 and other components in computer system 600.

In at least one embodiment, processor 602 may include, without limitation, a Level 1 ("L1") internal cache memory ("cache") 604. In at least one embodiment, processor 602 may have a single internal cache or multiple levels of internal cache. In at least one embodiment, cache memory may reside external to processor 602. In at least one embodiment, processor 602 may also include a combination of both internal and external caches. In at least one embodiment, a register file 606 may store different types of data in various registers including, without limitation, integer registers, floating point registers, status registers, and instruction pointer register.

In at least one embodiment, execution unit 607, including, without limitation, logic to perform integer and floating point operations, also resides in processor 602. Processor 602 may also include a microcode ("ucode") read only memory ("ROM") that stores microcode for certain macro instructions. In at least one embodiment, execution unit 602 may include logic to handle a packed instruction set 609. In at least one embodiment, by including packed instruction set 609 in an instruction set of a general-purpose processor 602, along with associated circuitry to execute instructions, operations used by many multimedia applications may be performed using packed data in a general-purpose processor 602. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, an execution unit may also be used in microcontrollers, embedded processors, graphics devices, DSPs, and other types of logic circuits. In at least one embodiment, computer system 600 may include, without limitation, a memory 620. In at least one embodiment, memory 620 may be implemented as a DRAM device, an SRAM device, flash memory device, or other memory device. Memory 620 may store instruction(s) 619 and/or data 621 represented by data signals that may be executed by processor 602.

In at least one embodiment, a system logic chip may be coupled to processor bus 610 and memory 620. In at least one embodiment, the system logic chip may include, without limitation, a memory controller hub ("MCH") 616, and processor 602 may communicate with MCH 616 via processor bus 610. In at least one embodiment, MCH 616 may provide a high bandwidth memory path 618 to memory 620 for instruction and data storage and for storage of graphics commands, data and textures. In at least one embodiment, MCH 616 may direct data signals between processor 602, memory 620, and other components in computer system 600 and to bridge data signals between processor bus 610, memory 620, and a system I/O 622. In at least one embodiment, system logic chip may provide a graphics port for coupling to a graphics controller. In at least one embodiment, MCH 616 may be coupled to memory 620 through high bandwidth memory path 618 and graphics/video card 612 may be coupled to MCH 616 through an Accelerated Graphics Port ("AGP") interconnect 614.

In at least one embodiment, computer system 600 may use system I/O 622 that is a proprietary hub interface bus to couple MCH 616 to I/O controller hub ("ICH") 630. In at least one embodiment, ICH 630 may provide direct connections to some I/O devices via a local I/O bus. In at least one embodiment, local I/O bus may include, without limitation, a high-speed I/O bus for connecting peripherals to memory 620, a chipset, and processor 602. Examples may include, without limitation, an audio controller 629, a firmware hub ("flash BIOS") 628, a transceiver 626, a data storage 624, a legacy I/O controller 623 containing a user input interface 625 and a keyboard interface, a serial expansion port 627, such as a USB, and a network controller 634. Data storage 624 may comprise a hard disk drive, a floppy disk drive, a CD-ROM device, a flash memory device, or other mass storage device. In an embodiment, the transceiver 626 includes a constrained FFE 608.

In at least one embodiment, FIG. 6 illustrates a system, which includes interconnected hardware devices or "chips" in the transceiver 626—e.g., the transceiver 626 includes a chip-to-chip interconnect including the first device 110 and second device 112 as described with reference to FIG. 1). In at least one embodiment, FIG. 6 may illustrate an exemplary SoC. In at least one embodiment, devices illustrated in FIG. 6 may be interconnected with proprietary interconnects, standardized interconnects (e.g., PCIe), or some combination thereof and utilize a GRS link 220 as described with reference to FIG. 2. In at least one embodiment, one or more components of system 600 are interconnected using compute express link ("CXL") interconnects. In an embodiment, the transceiver 626 can include training logic 115 as described with reference to FIGS. 1 and 4. In such embodiments, the training logic 115 can facilitate a method for link training through handshaking on a high-speed interconnect. For example, training logic 115 can store a plurality of messages associated with training the link or an initialization of the link. The training logic 115 can select messages from the plurality of messages to communicate about the link training or link initialization as described with reference to FIGS. 2-5.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system comprising:
a first device coupled with a link comprising two or more data paths and a first portion and a second portion, the first device comprising a transmitter, the first device to:
transmit a number of bits corresponding to a message before training the link on the first portion of the link, wherein the number of bits is equal to a number of the two or more data paths, and wherein each data path transmits one bit of the number of bits; and
a second device coupled with the link comprising a receiver and a second transmitter, the second device to:
receive the number of bits corresponding to the message before training the link;
perform a decode operation on the number of bits received to determine the corresponding message; and
transmit a second message or data on the second portion of the link in response to performing the decode operation on the number of bits.

2. The system of claim 1, wherein the second message or data is training data associated with training the second portion of the link.

3. The system of claim 1, wherein the first device transmits the number of bits for three or more burst lengths.

4. The system of claim 1, wherein the first device is further to:
select the message before training the link from a plurality of messages associated with training the link, wherein a number of messages in the plurality of messages corresponds to a number of data paths of the two or more data paths.

5. The system of claim 4, wherein a message of the plurality of messages indicates at least one of to initiate training of the link, pause training of the link, completion of training the link, or a status of the link.

6. The system of claim 1, wherein the first device further comprises a receiver, the first device to:
receive the second message or data from the second portion of the link;
train the second portion of the link in response to receiving the second message or data; and
transmit a second number of bits corresponding to a third message associated with a completion of training the second portion of the link on the first portion of the link, the second number of bits equal to the number of the two or more data paths.

7. The system of claim 6, wherein the second device is further to:
receive the second number of bits corresponding to the third message;
perform a second decode operation on the second number of bits to determine the third message; and
stop transmitting the data on the second portion of the link associated with training the second portion of the link in response to performing the decode operation on the second number of bits and determining the third message.

8. The system of claim 7, wherein the message is associated with training the link from the first device to the second device, and wherein the second device is further to:
transmit, to the first device, a third number of bits corresponding to a fourth message associated with training the first portion of the link from the second device to the first device, wherein the third number of bits is equal to a number of the two or more data paths.

9. The system of claim 1, wherein the message is associated with training the link, a status of the link, negotiations of the link, or any combination thereof.

10. A method, comprising:
receiving, by a first device, a number of bits corresponding to a message associated with training a first portion of a link coupled to the first device, wherein the number of bits is equal to a number of data paths in the link, and wherein each data path receives one bit of the number of bits;
performing a decode operation on the number of bits received to determine the corresponding message; and
transmitting, from the first device, training data associated with training the first portion of the link in response to performing the decode operation on the number of bits and determining the corresponding message.

11. The method of claim 10, further comprising:
receiving, at a second device from the first portion of the link, the training data associated with training the first portion of the link;
training the first portion of the link in response to receiving the training data;
selecting a second message from a plurality of messages to transmit in response to training the link; and
transmitting a second number of bits corresponding to the second message associated with a completion of training the link on a second portion of the link, the second number of bits equal to the number of data paths in the link.

12. The method of claim 11, further comprising:
receiving, at the first device from the second portion of the link, the second number of bits corresponding to the second message;
performing the decode operation on the second number of bits received to determine the corresponding second message; and
stopping the transmitting of the training data associated with training the first portion of the link in response to performing the decode operation on the second number of bits.

13. The method of claim 11, wherein the first device transmits the number of bits for three or more burst lengths.

14. The method of claim 11, further comprising:
receiving, at the first device from the second portion of the link, the second number of bits corresponding to the second message;
performing the decode operation on the second number of bits received to determine the corresponding second message; and
transmitting, from the first device, a third number of bits corresponding to a third message associated with training the second portion of the link coupled to the first device wherein the third number of bits is equal to the number of data paths in the link, and wherein each data path transmits one bit of the third number of bits.

15. The method of claim 14, further comprising:
receiving, at the second device, the third number of bits corresponding to the third message;
performing the decode operation on the third number of bits received to determine the corresponding third message; and
transmitting, from the second device, training data associated with training the second portion of the link in response to performing the decode operation on the third number of bits and determining the third corresponding message.

16. The method of claim 10, further comprising:
selecting, at a second device, the message before training the first portion of the link from a plurality of messages associated with training the link, wherein a number of messages in the plurality of messages corresponds to a number of data paths in the link.

17. The method of claim 16, wherein a message of the plurality of messages indicates at least one of to initiate training of the link, pause training of the link, completion of training the link, or a status of the link.

18. The method of claim 10, wherein the message is associated a status of the link, negotiations of the link, or any combination thereof.

19. A device, comprising:
a receiver coupled with a link, the receiver to:
receive a number of bits corresponding to a message associated with training a first portion of the link, wherein the number of bits is equal to a number of data paths in the link, and wherein each data path transmits one bit of the number of bits; and
perform a decode operation on the number of bits received to determine the corresponding message; and
a transmitter coupled with the link, the transmitter to:
transmit training data associated with training the first portion of the link in response to performing the decode operation on the number of bits and determining the corresponding message.

20. The device of claim 19, wherein:
the receiver is further to:
receive, from a second portion of the link, a second number of bits corresponding to a second message;
perform the decode operation on the second number of bits received to determine the corresponding second message; and
the transmitter is further to:
stop transmitting the training data associated with training the first portion of the link in response to the decode operation on the second number of bits.

* * * * *